United States Patent
Hang (10) Patent No.: US 8,873,469 B2
(45) Date of Patent: Oct. 28, 2014

(54) METHOD AND APPARATUS FOR REDUCING ACCESS LATENCY IN A WIRELESS COMMUNICATION SYSTEM

(75) Inventor: Ling Hang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 945 days.

(21) Appl. No.: 10/884,142

(22) Filed: Jun. 30, 2004

(65) Prior Publication Data

US 2008/0159202 A1     Jul. 3, 2008

Related U.S. Application Data

(60) Provisional application No. 60/486,448, filed on Jul. 10, 2003.

(51) Int. Cl.
*H04W 4/00* (2009.01)
*H04W 56/00* (2009.01)
*H04W 92/10* (2009.01)

(52) U.S. Cl.
CPC ............ *H04W 56/001* (2013.01); *H04W 92/10* (2013.01)
USPC ............................ 370/329; 370/341; 370/350

(58) Field of Classification Search
None
See application file for complete search history.

(56) References Cited

U.S. PATENT DOCUMENTS

| 5,825,759 | A | * | 10/1998 | Liu ............................... 370/331 |
| 6,205,465 | B1 | | 3/2001 | Schoening et al. |
| 6,526,038 | B1 | * | 2/2003 | Jain et al. ...................... 370/347 |
| 6,967,936 | B1 | * | 11/2005 | Laroia et al. .................. 370/329 |

OTHER PUBLICATIONS

International Search Report and Written Opinion—PCT/US2004/022002—ISA/EPO—Mar. 8, 2006.

* cited by examiner

*Primary Examiner* — Phuc Tran
*Assistant Examiner* — Soon-Dong D Hyun
(74) *Attorney, Agent, or Firm* — Michael F. Taveira (57) ABSTRACT

To reduce latency in accessing a wireless communication system, which is highly desirable for time sensitive applications such as push-to-talk call, a wireless device performs an overhead update procedure and a transmit clock synchronization procedure in parallel. The overhead update procedure obtains up-to-date overhead information from the system, such as access parameters used to access the system. The transmit clock synchronization procedure updates transmit timing to current system time, e.g., resets a long or scrambling code and pseudo-random number (PN) sequences used to transmit signaling to the system. After the overhead information has been updated and the transmit clock synchronization procedure has been completed, the wireless device performs an access probe procedure to send signaling (or access probes) to the system to attempt to access the system.

35 Claims, 7 Drawing Sheets

METHOD AND APPARATUS FOR REDUCING ACCESS LATENCY IN A WIRELESS COMMUNICATION SYSTEM

This application claims the benefit of provisional U.S. Application Ser. No. 60/486,448, entitled "Method and Apparatus for Reducing Access Latency," filed Jul. 10, 2003.

BACKGROUND

I. Field

The present invention relates generally to communication, and more specifically to a method and apparatus for reducing delay or latency in accessing a wireless communication system.

II. Background

Wireless communication systems are widely deployed to provide various communication services such as voice, packet data, and so on. These systems may be multiple-access systems capable of supporting communication for multiple users by sharing the available system resources (e.g., bandwidth and transmit power). Examples of such multiple-access systems include Code Division Multiple Access (CDMA) systems, Time Division Multiple Access (TDMA) systems, and Frequency Division Multiple Access (FDMA) systems.

A wireless device (e.g., a cellular phone) may actively exchange data with a base station for a voice or data call. At the start of the call, the wireless device may exchange signaling with the base station to receive a channel assignment, configure various parameters, and so on. Thereafter, the wireless device may exchange data with the base station using the assigned channels and configured parameters.

A wireless device may also be intermittently or sporadically active for a call. For example, the wireless device may have a push-to-talk (PTT) call with one or more other peer wireless devices. The wireless device may receive messages from the peer wireless devices and may also transmit messages to these peer wireless devices whenever initiated by a user at the wireless device. Data transmission and reception by the wireless device for the PTT call may be sporadic and may occur at any time. To conserve battery power and extend both standby time and talk time, the wireless device may power down as much circuitry as possible when not transmitting during the PTT call. If the user desires to send a message, then the wireless device would need to wake up and perform access procedures before the device can start transmitting. The delay incurred to perform the access procedures is called "access latency". Reducing access latency is important in order to achieve a quick response to a user-initiated transmission. Minimal access latency can enhance user experience and is highly desirable for PTT and other time sensitive applications.

There is therefore a need in the art for techniques to reduce access latency in a wireless communication system.

SUMMARY

Methods and apparatus for reducing access latency in a wireless communication system are described herein. A wireless device typically performs various procedures in order to access the system. Such procedures may include, for example, an overhead update procedure, a transmit clock synchronization procedure, or an access probe procedure, each of which may also be referred to by other names. The overhead update procedure obtains up-to-date overhead information from the system, such as access parameters used to access the system. The transmit clock synchronization procedure updates transmit timing to current system time, e.g., resets a long or scrambling code and pseudo-random number (PN) sequences used to transmit signaling to the system. The access probe procedure sends signaling (or access probes) to the system to attempt to access the system. The overhead update procedure and the transmit clock synchronization procedure may be performed in parallel to reduce access latency and provide a quick response.

In one embodiment, a call processing module receives a request to access the system (e.g., for a user-initiated call). In response, the call processing module sends a first command to a transmit (TX) module to perform the transmit clock synchronization procedure and sends a second command to a receive (RX) module to process overhead messages for the overhead update procedure. After the overhead information has been updated and current access parameters are available, the call processing module sends a third command to the TX module to perform the access probe procedure. The TX module performs the access probe procedure after completing the transmit clock synchronization procedure.

In one embodiment, a method is presented for accessing a wireless communication system, the method comprising: sending a first command to a first module to perform clock synchronization; and sending a second command to a second module to receive and process overhead messages from the system, wherein the first module performs the clock synchronization and the second module processes the overhead messages in parallel.

In another embodiment, an apparatus is presented for a wireless communication system, the apparatus comprising: a call processing module operative to send a first command to a first module to perform clock synchronization and to send a second command to a second module to receive and process overhead messages from the system, wherein the first module performs the clock synchronization and the second module processes the overhead messages in parallel.

In another embodiment, an apparatus is presented for a wireless communication system, the apparatus comprising: means for sending a first command to a first module to perform clock synchronization; and means for sending a second command to a second module to receive and process overhead messages from the system, wherein the first module performs the clock synchronization and the second module processes the overhead messages in parallel.

In another embodiment, a method is presented for accessing a wireless communication system, the method comprising: receiving a command; performing clock synchronization if instructed by the received command; and sending signaling to access the system if instructed by the received command, and wherein the clock synchronization is performed in parallel with updating of overhead information from the system.

In another embodiment, an apparatus is presented for a wireless communication system, the apparatus comprising: first module operative to perform clock synchronization when instructed; a second module operative to receive and process overhead messages from the system when instructed; and a call processing module operative to send a first command to the first module to perform clock synchronization and to send a second command to the second module to receive and process the overhead messages from the system, wherein the first module performs the clock synchronization and the second module processes overhead messages in parallel.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The methods and apparatus for reducing access latency described herein may be used for various wireless communication systems such as CDMA, TDMA, and FDMA systems. A CDMA system may implement one or more CDMA standards such as IS-2000, W-CDMA, IS-856, and IS-95, all of which are known in the art. A TDMA system may implement one or more TDMA standards such as Global System for Mobile Communications (GSM), which is also known in the art.

For clarity, the methods and apparatus for reducing access latency are specifically described below for a CDMA system that implements IS-2000. The physical layer for IS-2000 is described in a document 3GPP2 C.S0002-D, entitled "Physical Layer Standard for cdma2000 Spread Spectrum Systems Revision D," Version 1.0, dated Feb. 13, 2004, which is referred to herein as the C.S0002-D document. The link layer for IS-2000 is described in a document 3GPP2 C.S0004-D, entitled "Signaling Link Access Control (LAC) Standard for cdma2000 Spread Spectrum Systems Release D," Version 1.0, dated Feb. 13, 2004. The upper layer for IS-2000 is described in a document 3GPP2 C.S0005-D, entitled "Upper Layer (Layer 3) Signaling Standard for cdma2000 Spread Spectrum Systems Release D," Version 1.0, dated February 2004, which is referred to herein as the C.S0005-D document. These documents are publicly available from 3GPP2 organization. The terms "IS-2000" and "cdma2000" are often used interchangeably.

Figure 1:
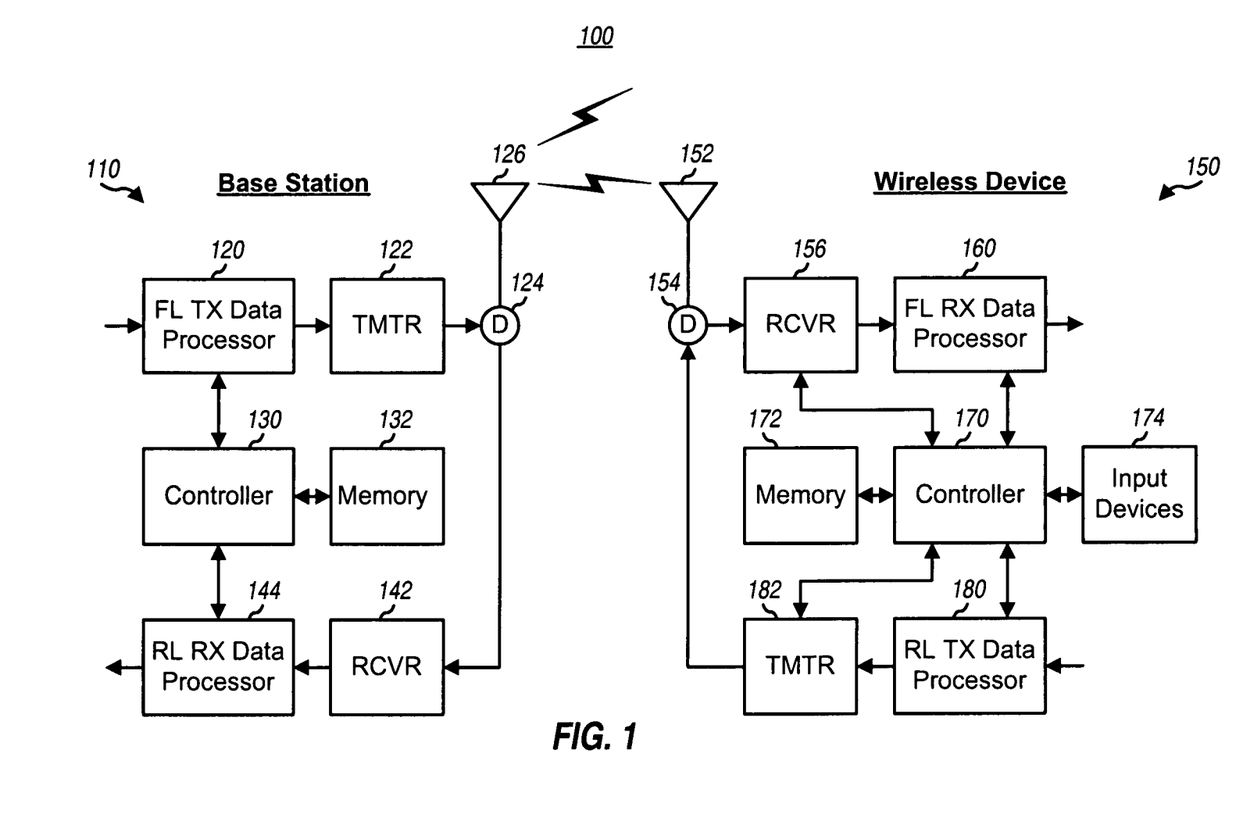
FIG. 1 shows a block diagram of a base station and a wireless device.

FIG. 1 shows a block diagram of a base station 110 and a wireless device 150 in an IS-2000 system 100. A base station is generally a fixed station and may also be called a base transceiver station (BTS), a Node B, an access point, or some other terminology. A wireless device may be fixed or mobile and may also be called a mobile station (MS), a remote station, a mobile equipment (ME), a user equipment (UE), a user terminal, a subscriber unit, or some other terminology. Base station 110 and wireless device 150 may exchange data via the forward link and reverse link. The forward link (or downlink) refers to the communication link from the base station to the wireless device, and the reverse link (or uplink) refers to the communication link from the wireless device to the base station.

At base station 110, a forward link (FL) transmit (TX) data processor 120 receives various types of data (e.g., voice data, packet data, and signaling), processes (e.g., encodes, interleaves, modulates, channelizes, scrambles, and spectrally spreads) the received data for transmission on forward link channels, and provides a stream of data chips. A transmitter unit (TMTR) 122 conditions (e.g., converts to analog, amplifies, filters, and frequency upconverts) the data chips to generate a forward link signal. The forward link signal is routed through a duplexer (D) 124 and transmitted via an antenna 126.

At wireless device 150, the forward link signal is received by an antenna 152, routed through a duplexer 154, and provided to a receiver unit (RCVR) 156. Receiver unit 156 conditions (e.g., filters, amplifies, frequency downconverts, and digitizes) the received signal to obtain data samples. An FL receive (RX) data processor 160 processes (e.g., spectrally despreads, data demodulates, descrambles, dechannelizes, deinterleaves, and decodes) the data samples to obtain decoded data for wireless device 150. FL RX data processor 160 may implement a rake receiver that can process multiple signal instances received from base station 110.

For the reverse link (RL), an RL TX data processor 180 receives and processes various types of data for transmission on reverse link channels. A transmitter unit 182 then conditions a stream of data chips from RL TX data processor 180 to generate a reverse link signal, which is routed through duplexer 154 and transmitted via antenna 152. At base station 110, the reverse link signal is received by antenna 126, routed through duplexer 124, and provided to a receiver unit 142. Receiver unit 142 conditions the received signal and provides a sample stream. An RL RX data processor 144 processes the sample stream and recovers the data sent by wireless device 150.

Controllers 130 and 170 direct the operation of various units within base station 110 and wireless device 150, respectively. Memory units 132 and 172 store data and program codes used by controllers 130 and 170, respectively. Input devices 174 (e.g., keypads or voice recognizers) at wireless device 150 receive inputs from a user and provide the user inputs to controller 170.

Figure 2:
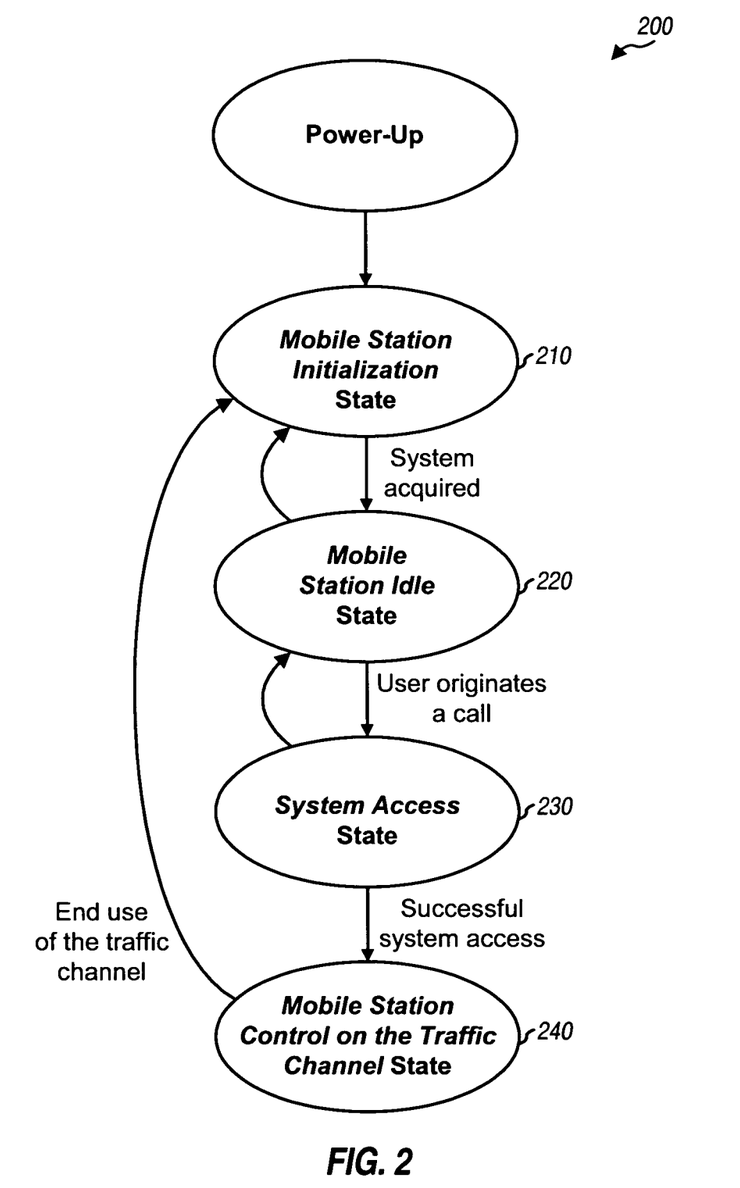
FIG. 2 shows a state diagram of Layer 3 processing states in IS-2000.

FIG. 2 shows a state diagram 200 of Layer 3 processing states in IS-2000. Wireless device 150 enters a Mobile Station Initialization state 210 upon power-up. In state 210, the wireless device selects and acquires a system. System acquisition typically includes tuning to a frequency band used by the system, searching for pilots transmitted by base stations in the system, receiving a Sync Channel Message (SCHM) that carries system timing, synchronizing to the timing of each base station found, and so on. Upon acquiring the system, the wireless device transitions to a Mobile Station Idle state 220.

In state 220, the wireless device can receive or originate a call, perform registration, receive or initiate a message transmission, and perform other actions. Upon initiating any of these actions, the wireless device transitions to a System Access state 230 to access the system. In state 230, the wireless device exchanges signaling with the system on forward and reverse common channels. The wireless device then proceeds to a Mobile Station Control on the Traffic Channel state 240 if a call is active and communicates with the system in state 240. The wireless device returns to state 210 or 220 upon terminating the call. The wireless device may transition from other states to state 220 if there are no other tasks to perform and to state 210 if there is a failure in accessing or communicating with the system. The processing for the states shown in FIG. 2 is described in the aforementioned C.S0005-D document.

Figure 3:
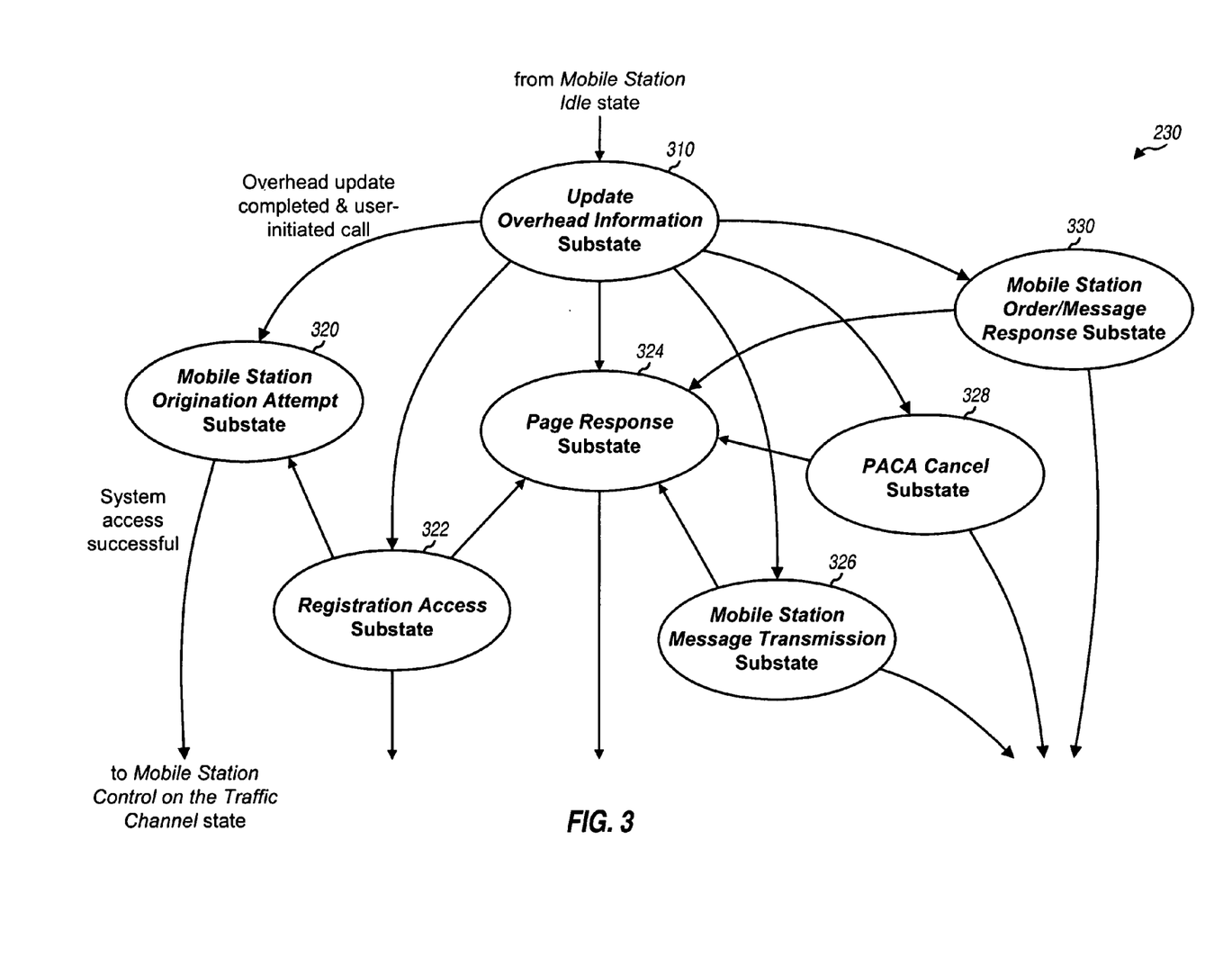
FIG. 3 shows a state diagram of a System Access state in IS-2000.

FIG. 3 shows a state diagram of System Access state 230. The wireless device transitions from Mobile Station Idle state 220 to an Update Overhead Information substate 310 within state 230. In substate 310, the wireless device performs an overhead update procedure to obtain up-to-date access parameters. For the overhead update procedure, the wireless device may monitor either a Primary Broadcast Control Channel (BCCH) or a Paging Channel (PCH) to receive a current set of overhead messages that carries access parameters for the system. For simplicity, the Primary BCCH is referred to as the BCCH in the following description. The BCCH carries overhead messages but no pages. The PCH carries both overhead messages and pages. A base station may also transmit a Forward Common Control Channel (F-CCCH) that carries user-specific messages (i.e., messages addressed to specific wireless devices, or mobile addressed messages), queries for the status of wireless devices, pages, and so on. A base station typically transmits both the PCH and F-CCCH, but a wireless device only monitors either the PCH or F-CCCH. Thus, the base station typically does not transmit a user-specific message addressed to the same wireless device on both of the PCH and F-CCCH because the wireless device only monitors one or the other. For clarity, the following description assumes that the base station transmits the PCH. The wireless device performs different processing for the BCCH and PCH, as described below.

Upon completing the overhead update procedure, the wireless device transitions to one of the other six substates shown in FIG. 3 depending on which action caused the transition to System Access state 230. For example, the wireless device transitions to (1) a Mobile Station Origination Attempt substate 320 for a user-initiated call, (2) a Registration Access substate 322 if registration is required, (3) a Page Response substate 324 if a page was received from the system, (4) a Mobile Station Message Transmission substate 326 for a user-generated message, (5) a PACA Cancel substate 328 for a user-canceled PACA (Priority Access and Channel Assignment) call, or (6) a Mobile Station Order/Message Response substate 330 for a received message or order requiring acknowledgment.

If the wireless device needs to transmit on the reverse link for any of substates 320 through 330, then the wireless device performs a transmit clock synchronization procedure to update its transmit timing to system time. The wireless device may need to transmit on the reverse link to access the system or for other reasons. System access may be initiated by the user, a base station, a higher layer application, a timer at the wireless device (e.g., for timer-based registration), and so on. If the wireless device needs to access the system in any one of substates 320 through 330, then the wireless device performs an access probe procedure to transmit access probes (which are specific signaling sent in a specific manner) on a Reverse Access Channel (R-ACH) or a Reverse Enhanced Access Channel (R-EACH) to attempt to access the system. If system access is successful, then the wireless device transitions from one of substates 320 through 330 to Mobile Station Control on the Traffic Channel state 240 and exchanges data with the system. The processing for the various substates of System Access state 230 is also described in the aforementioned C.S0005-D document.

The wireless device updates overhead information and performs transmit clock synchronization before the device can transmit on the reverse link for system access. These two procedures may be performed as described below.

Overhead Update Procedure

For the overhead update procedure, the wireless device monitors the BCCH or PCH for overhead messages. Certain overhead messages carry an access parameters message sequence number (ACC_MSG_SEQ), which indicates the current version of the access parameters. A base station increments the ACC_MSG_SEQ value whenever the base station sends new access parameters. Since a base station typically updates the access parameters infrequently, the wireless device normally stores the ACC_MSG_SEQ value whenever the device receives new access parameters. To check whether the access parameters stored by the wireless device are still current, the wireless device receives at least one message carrying the ACC_MSG_SEQ, except when responding to a page, which already carries the ACC_MSG_SEQ. Such a message with the ACC_MSG_SEQ may be an overhead message sent on the BCCH or PCH or a user-specific message sent on the PCH or F-CCCH to the wireless device. Overhead messages that carry the ACC_MSG_SEQ include an Access Parameter Message (APM) and an Enhance Access Parameter Message (EAPM). User-specific messages that carry the ACC_MSG_SEQ include a General Page Message (GPM) and a Universal Page Message (UPM). If the received ACC_MSG_SEQ matches the stored ACC_MSG_SEQ, which is often the case, then this indicates that the base station has not updated any access parameter. In this case, the wireless device does not need to receive the rest of the overhead messages and can transition out of Update Overhead Information substate 310. Otherwise, if the received ACC_MSG_SEQ does not match the stored ACC_MSG_SEQ, then the wireless device waits for an APM or an EAPM carrying the updated access parameters. In addition, if the wireless device is monitoring the BCCH and a SENDING_RANDS parameter is set to '1', then the wireless device also waits for an ANSI-41 RAND Message.

Some overhead messages (e.g., a System Parameter Message (SPM) and a Neighbor List Message (NLM)) and some user-specific messages (e.g., the GPM and UPM) also carry a configuration message sequence number (CONFIG_MSG_SEQ), which indicates the configuration of the system. The wireless device typically stores the CONFIG_MSG_SEQ in similar manner as the ACC_MSG_SEQ. If the received CONFIG_MSG_SEQ is different from the stored CONFIG_MSG_SEQ, then the wireless device collects certain overhead information. For simplicity, the following description assumes that the wireless device does not need to update the access parameters, although this is not a requirement to utilize the method and apparatus described herein.

Each base station transmits a complete set of overhead messages every T1b=1.28 seconds on each of the BCCH and PCH. A network operator can determine the manner in which each base station transmits the overhead messages. The worst-case latency for updating all overhead messages is 1.28 seconds for both the BCCH and PCH. This delay is deemed too long for many time sensitive applications such as PTT. However, for the typical case, the wireless device only needs to receive one overhead message that carries the ACC_MSG_SEQ.

If the wireless device is monitoring the BCCH, then the shortest delay for updating overhead information is 40 milliseconds (msec). This assumes that (1) the wireless device receives an EAPM on the first frame that the device monitors and (2) the ACC_MSG_SEQ value has not changed. Since the frame size for the BCCH is 40 msec, the shortest delay is thus 40 msec. If there are no page messages (which carry the ACC_MSG_SEQ), then the worst-case delay for receiving the ACC_MSG_SEQ on the BCCH is 1.28 seconds.

If the wireless device is monitoring the PCH, then the shortest delay for updating overhead information is also 40 msec. The PCH is partitioned into 80 msec slots. A base station may transmit one or more pages or one or more overhead messages in each slot. Each slot is further partitioned into four 20 msec frames. On the PCH, a message is encoded and sent to the wireless device in its assigned slot, for example, every 1.28 seconds. The wireless device is not able to decode the message based on code bits received on one frame and thus waits until additional code bits arrive in a second frame. Since the wireless device typically performs decoding at a frame boundary and since the frame size for the PCH is 20 msec, the shortest delay is thus 40 msec for two frames on the PCH. The worst-case delay to obtain the ACC_MSG_SEQ on the PCH or F-CCCH is the time interval between pages sent by the base station. Since the base station is required to transmit at least one GPM or UPM every other PCH or FCCCH slot, the worst-case scenario is when the wireless device just missed a GPM on one slot and has to wait until the next GPM is sent two slots later. The worst-case delay is thus approximately three slots or 240 msec, which assumes that the base station sends one GPM at the beginning of slot #1 and sends the following GPM at the end of slot #3. The base station may transmit a page in every slot or every other slot, depending on the manner in which the base station is operated. If the base station transmits a GPM every other slot, then the nominal delay to update overhead information is approximately 100 msec if the wireless device monitors the PCH or FCCCH. This assumes that (1) the wireless device can decode a page message after two frames and (2) the ACC_MSG_SEQ value has not changed.

Transmit Clock Synchronization Procedure

Each base station scrambles data with a long code and spectrally spreads the scrambled data with a pair of short PN sequences prior to transmission on the forward link. Similarly, the wireless device scrambles data with the long code and spectrally spreads the scrambled data with the short PN sequences prior to transmission on the reverse link (e.g., on the Reverse Access Channel to access the system). The same long code and short PN sequences are used for both the forward link and reverse link. However, the timing of the long code and short PN sequences for the forward link is different from the timing of the long code and short PN sequences for the reverse link. For the wireless device, "receive timing" refers to the state of the long code and short PN sequences used for the forward link, and "transmit timing" refers to the state of the long code and short PN sequences used for the reverse link. The receive timing and transmit timing are related.

In Mobile Station Idle state 220, the wireless device may go to sleep if it is inactive for an extended period of time. In the sleep state, the wireless device powers down as much circuitry as possible to conserve battery power. The wireless device typically maintains a real-time clock to keep track of system time, and this clock is normally disabled during sleep to conserve battery power. The wireless device maintains a less accurate sleep clock while asleep. The wireless device periodically wakes up and makes measurements on pilots received via the forward link and updates the receive timing accordingly. While idle, the wireless device typically only needs to listen for messages on the forward link and typically disables most or all transmit circuitry.

If the wireless device needs to transmit on the reverse link (e.g., for any one of substates 320 through 330 in FIG. 3), then the wireless device performs the transmit clock synchronization procedure to update the transmit timing prior to transmitting on the reverse link. For the transmit clock synchronization procedure, the wireless device ascertains the correct transmit timing based on the receive timing and then resets the long code and the short PN sequences for the reverse link to the correct transmit timing. Correct alignment of the long code and the short PN sequences to system time is needed for the reverse link so that a base station can receive a reverse link transmission on the Reverse Access Channel. The transmit clock synchronization procedure normally takes some amount of time to complete (e.g., 140 to 200 msec for one exemplary design for the wireless device).

System Access

A call processing module within the wireless device may perform and/or supervise the processing for the state and substates shown in FIGS. 2 and 3. The call processing module resides at Layer 3 (L3) of a protocol stack for the IS-2000 system.

In Update Overhead Information substate 310, the call processing module may instruct the RX module to monitor and decode the BCCH or PCH for overhead messages. The call processing module may then update the overhead information based on the content of the decoded overhead messages. Once the overhead information has been updated, the call processing module may instruct the TX module to start system access. The TX module may then perform transmit clock synchronization and thereafter send an access probe on the Reverse Access Channel to the base station. If updating overhead information takes 100 msec on average and performing transmit clock synchronization takes 140 msec on average, then the average total delay is 240 msec if these two tasks are performed sequentially.

The embodiments are directed to reducing access latency by performing the transmit clock synchronization concurrently with the overhead information updating. These two tasks may be performed independently and in parallel by two modules—the RX and TX modules. Access latency may be reduced without impacting the standby time of the wireless device. Alternatively, the wireless device may keep the real-time clock running even while asleep, so that accurate transmit timing is available upon waking up, but this would consume battery power and shorten standby time, which is undesirable.

Figure 4:
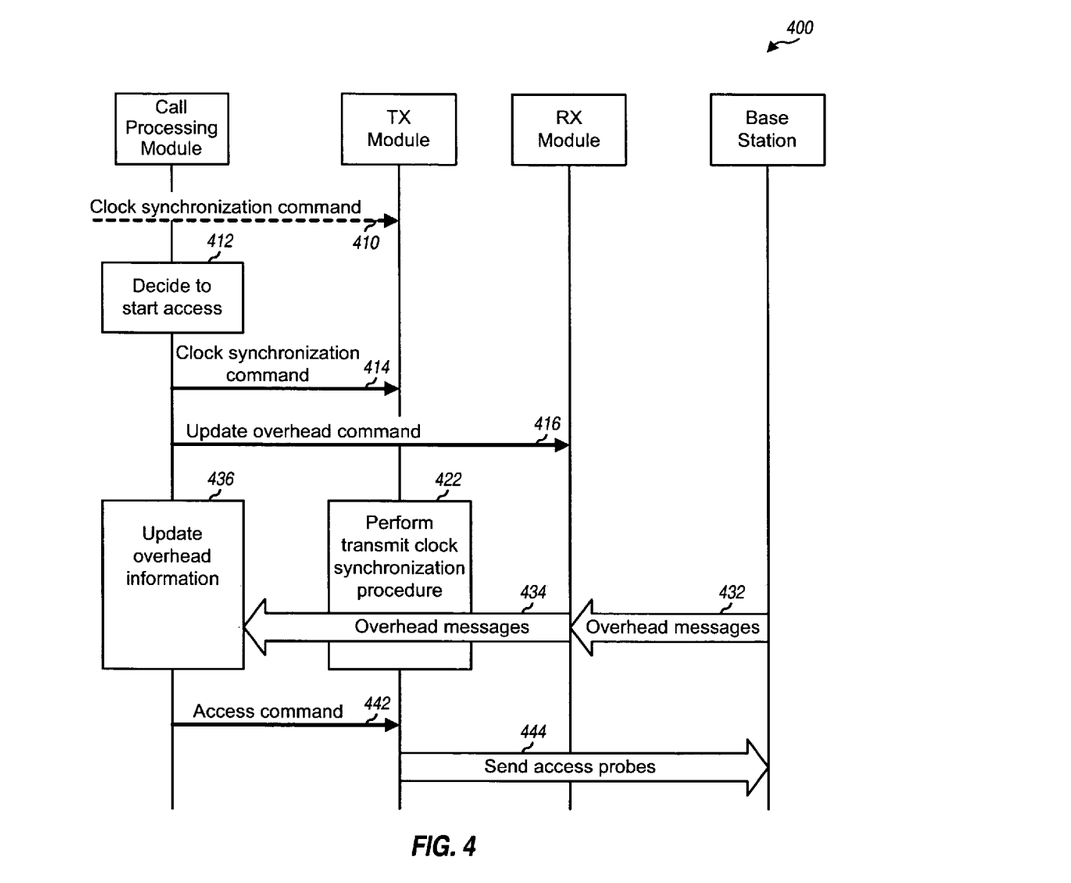
FIG. 4 shows an access procedure with parallel overhead information updating and transmit clock synchronization.

FIG. 4 shows a signal flow diagram of an access procedure 400 with parallel overhead information updating and transmit clock synchronization. The call processing module receives or obtains an indication to start access attempt (block 412). This indication may come from a user-initiated action, a received page, a higher layer application, or so on. In response to the indication, the call processing module sends a clock synchronization command to the TX module (step 414) and sends an update overhead command to the RX module (step 416). The two commands may be sent to the TX and RX modules in any order.

Upon receiving the clock synchronization command, the TX module performs transmit clock synchronization to update the transmit timing to system time (block 422). Upon receiving the update overhead command, the RX module monitors the BCCH or PCH for certain overhead messages (step 432), decodes these overhead messages as they are received, and forwards the decoded overhead messages to the call processing module (step 434). The call processing module updates the overhead information based on the decoded overhead messages (block 436) and may send a termination command to the RX module once the overhead information has been updated.

As shown in FIG. 4, the overhead information updating and the transmit clock synchronization may be performed in parallel. Upon obtaining updated overhead information, the call processing module sends an access command to the TX module to start access (step 442). Upon receiving the access command, the TX module starts the access probe procedure if the transmit clock synchronization procedure has been completed (step 444). Otherwise, the TX module waits until the clock synchronization procedure is completed and then starts the access probe procedure.

In one respect, the TX module may also receive a clock synchronization command from a higher layer application or task such as a call manager (CM), a user interface (UD) application, a Binary Runtime Environment for Wireless (BREW) application, or so on, all of which reside above Layer 3 (step 410). These higher layer applications may send the clock synchronization command if transmission on the reverse link is needed (e.g., to access the system). The TX module performs the transmit clock synchronization procedure whenever it receives the clock synchronization command regardless of which module or application originates the command. The call processing module may keep track of when the clock synchronization command was sent by other applications so that duplicate commands are not sent to the TX module. Alternatively, the TX module can simply ignore duplicate commands if the TX module already has updated transmit timing.

Figure 5:
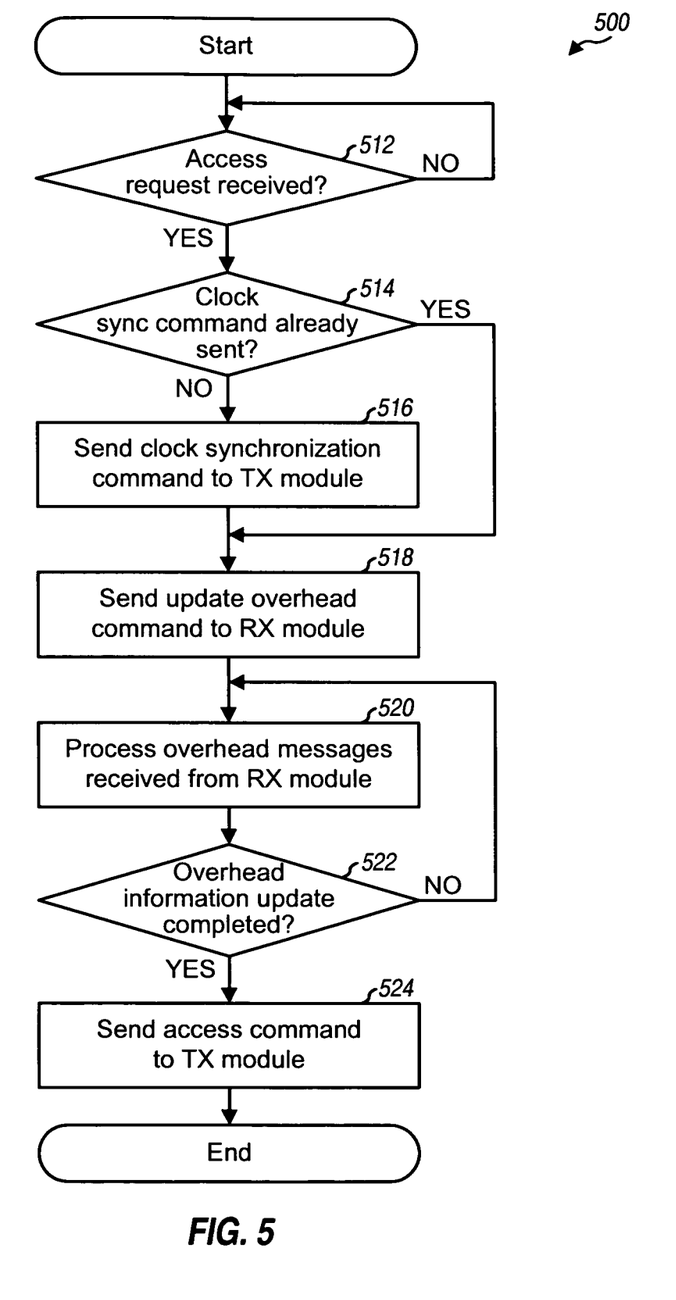
FIG. 5 shows a procedure performed by the call processing module for system access.

FIG. 5 shows a flow diagram of a procedure 500 performed by the call processing module for system access. The call processing module determines whether or not an access request has been received (block 512) and returns to block 512 if one was not received. If an access request was received, then the call processing module determines whether or not a clock synchronization command has been sent by a higher layer application (block 514). The call processing module sends a clock synchronization command to the TX module if one has not already been sent (block 516). The call processing module also sends an overhead update command to the RX module (block 518). Thereafter, the call processing module receives and processes decoded overhead messages from the RX module to update overhead information (block 520). If the overhead information update is completed, as determined in block 522, then the call processing module sends an access command to the TX module (block 524).

Figure 6:
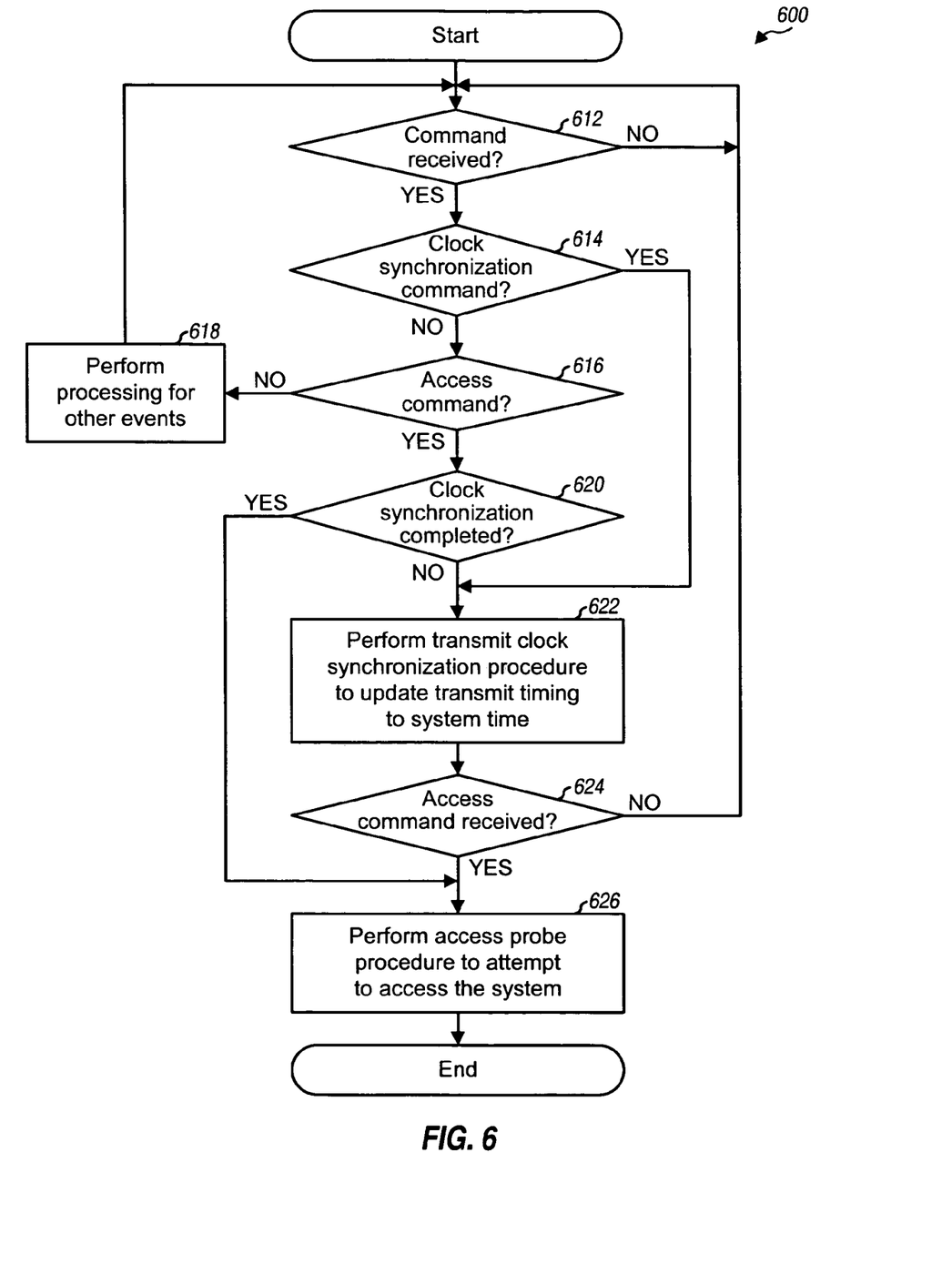
FIG. 6 shows a procedure performed by the TX module for system access.

FIG. 6 shows a flow diagram of a procedure 600 performed by the TX module for system access. Initially, the TX module determines whether or not a command has been received (block 612) and returns to block 612 if one was not received. If a command was received, then the TX module determines whether the received command is a clock synchronization command (block 614). If the answer is 'yes', then the TX module performs the transmit clock synchronization procedure to update the transmit timing to current system time (block 622).

If the answer is 'no' for block 614, then the TX module determines whether the received command is an access command (block 616). If the answer is 'no', then the TX module performs processing for other events in accordance with the received command (block 618) and then returns to block 612. If an access command was received in block 616, then the TX module determines whether the clock synchronization procedure has been completed (block 620). The TX module proceeds to block 622 if the answer is 'no' for block 620 and proceeds to block 626 otherwise.

The TX module may perform the clock synchronization procedure in response to receiving a clock synchronization command and may also perform this procedure (if not completed) in response to receiving an access command. In any case, after the clock synchronization procedure has been completed in block 622, the TX module determines whether an access command was received (block 624). If the access command was received and after the clock synchronization procedure has been completed, the TX module performs an access probe procedure to attempt to access the system (block 626).

Figure 7:
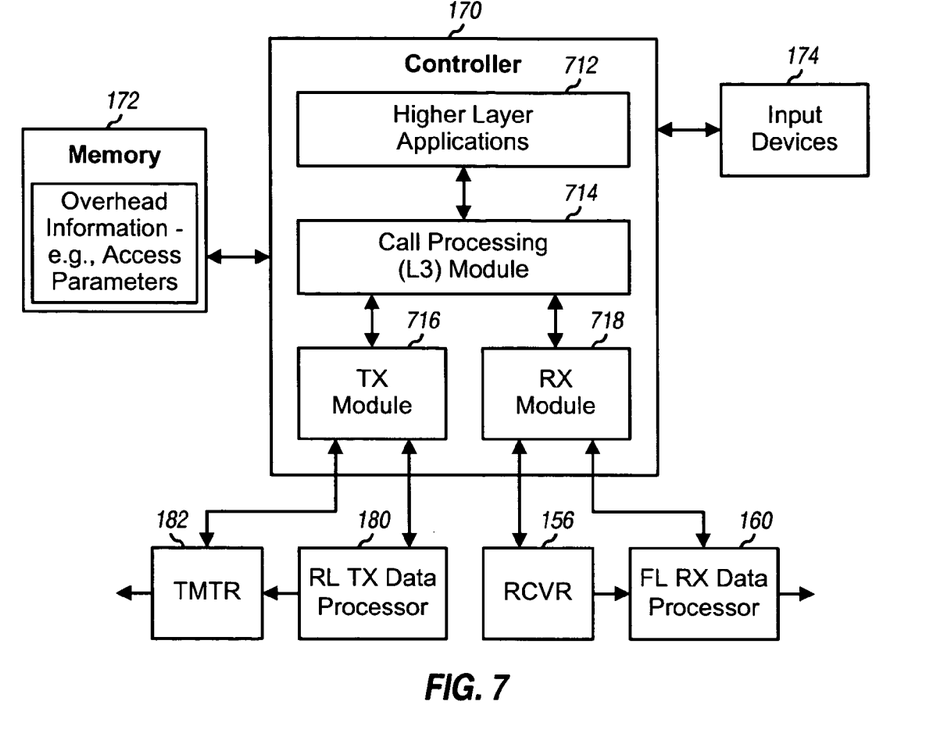
FIG. 7 shows a block diagram of a controller at the wireless device.

FIG. 7 shows a block diagram of an embodiment of controller 170 at wireless device 150. Within controller 170, higher layer applications 712 may support various end applications, which may include time-sensitive applications such as voice call, data call, push-to-talk call, voice-over-IP (Internet Protocol), video phone, teleconferencing, and so on. Each of these higher layer applications may be supported by a respective (e.g., software) module, and the proper module may be invoked when a higher layer application is activated (e.g., by the user). A call processing (L3) module 714 performs processing for call control and may implement access procedure 500 in FIG. 5. A TX module 716 controls the operation of RL TX data processor 180 and transmitter unit 182 and may implement procedure 600 in FIG. 6. An RX module 718 controls the operation of receiver unit 156 and FL RX data processor 160. Higher layer applications 712 communicate with call processing module 714 for call control functions. Call processing module 714 communicates with TX module 716 and RX module 718 as necessary for call control functions.

Memory unit 172 may store access parameters and other overhead information for call processing module 714. Input devices 174 may provide various user inputs, for example, to initiate a call, end a call, and so on.

Figure 8:
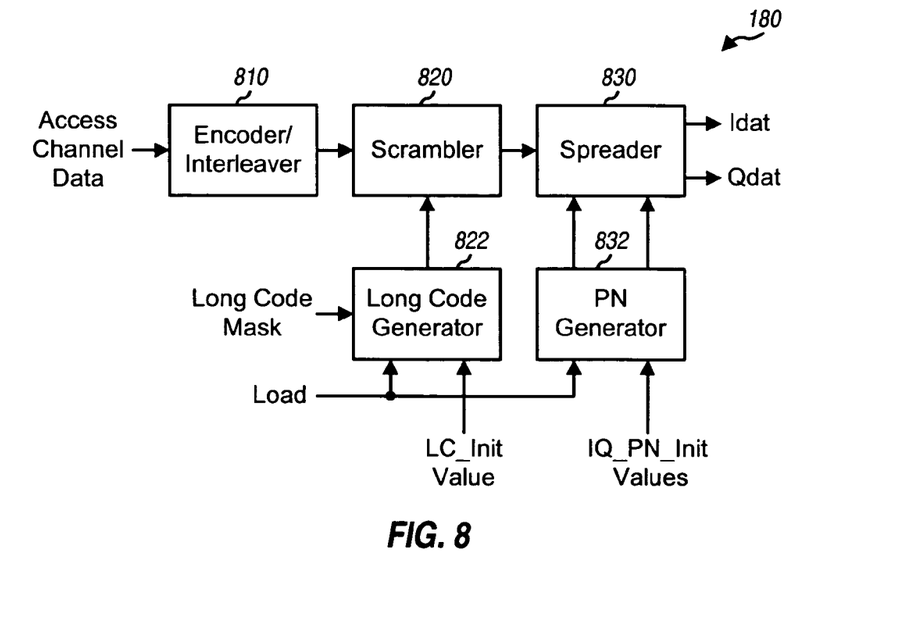
FIG. 8 shows the processing for a Reverse Access Channel in IS-2000.

FIG. 8 shows a block diagram of a portion of RL TX data processor 180 within wireless device 150. In particular, FIG. 8 shows the processing for the Reverse Access Channel (R-ACH) used to send access probes in IS-2000. Data for the R-ACH is encoded and interleaved by an encoder/interleaver 810, scrambled with a long code by a scrambler 820, and spectrally spread with inphase (I) and quadrature (Q) short PN sequences by a spreader 830 to generate I and Q data for the R-ACH. A long code generator 822 generates the long code for scrambler 820 based on a unique long code mask that is assigned to wireless device 150. Long code generator 822 may be implemented with a linear feedback shift register (LFSR) that is loaded with a proper initial value, LC_Init value, whenever triggered by a Load signal. A PN generator 832 generates the I and Q short PN sequences in accordance with two polynomial generators defined by IS-2000. PN generator 832 may be implemented with two LFSRs that are loaded with I and Q initial values, IQ_Init values, whenever triggered by the Load signal. The LC_Init and IQ_Init values are computed such that the long code and the I and Q short PN sequences are aligned to system time at the time instant the Load signal is activated.

The method and apparatus for reducing access latency described herein may be used for various applications and for various types of calls. The method and apparatus may be advantageously used for time sensitive and time critical applications and calls, such as those enumerated above. The method and apparatus can allow the wireless device to access the system faster and to bring up a call more quickly, which can greatly enhance user experience and usability for various applications.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method, procedure, process or algorithm described in connection with the embodiments disclosed herein may be embodied directly in hardware, in a software module executed by a processor, or in a combination of the two. A software module may reside in RAM memory, Flash memory, ROM memory, EPROM memory, EEPROM memory, registers, a hard disk, a removable disk, a CD-ROM, or any other form of storage medium known in the art. In general, a storage medium is communicatively coupled to the processor such that the processor can read information from, and write information to, the storage medium. In the alternative, the storage medium may be integral to the processor. The processor and the storage medium may reside in an ASIC, which may reside in a wireless device. In the alternative, the processor and the storage medium may reside as discrete components in a wireless device.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of accessing a wireless communication system, comprising:
   determining to transmit at least one message associated with a delay-sensitive communication session to an access network of the wireless communication system;
   sending a first command to a first module to perform a transmit clock synchronization procedure to synchronize a transmit clock; and
   sending a second command to a second module to receive and process one or more overhead messages from the access network, wherein the first module performs the transmit clock synchronization procedure and the second module processes the one or more overhead messages in parallel instead of sequentially in response to the at least one message to be transmitted being delay-sensitive.

2. The method of claim 1, further comprising:
   updating overhead information based on the one or more overhead messages processed by the second module.

3. The method of claim 2, wherein the updating the overhead information comprises:
   obtaining a sequence number from an overhead message processed by the second module,
   comparing the obtained sequence number against a stored sequence number from a prior updating of the overhead information, and
   terminating the updating of the overhead information if the obtained sequence number is equal to the stored sequence number.

4. The method of claim 2, wherein the overhead information comprises access parameters used to access the wireless communication system.

5. The method of claim 1, wherein the transmit clock synchronization procedure resets a long code generator and a pseudo-random number (PN) generator based on system time, the long code generator being used to generate a long code for scrambling data, and the PN generator being used to generate PN sequences for spectrally spreading data.

6. The method of claim 1, further comprising:
   sending a third command to the first module to transmit the at least one message associated with the delay-sensitive communication session to the access network.

7. The method of claim 6, wherein the third command is sent after overhead information has been updated.

8. The method of claim 1, further comprising:
   receiving a request to transmit the at least one message associated with the delay-sensitive communication session to the access network, and wherein the first and second commands are sent in response to receiving the request.

9. The method of claim 8, wherein the request is user-initiated.

10. The method of claim 8, wherein the delay-sensitive communication session is a push-to-talk call.

11. The method of claim 1, wherein the first and second commands are sent by a call processing module at Layer 3 in a protocol stack for the wireless communication system.

12. The method of claim 1, wherein the first command is sent by an application at a higher layer than Layer 3 in a protocol stack for the wireless communication system.

13. The method of claim 1, wherein the wireless communication system is a Code Division Multiple Access (CDMA) system.

14. The method of claim 1, wherein the transmit clock synchronization procedure and the reception and processing of the one or more overhead messages are performed sequentially for message transmissions that are not associated with the delay-sensitive communication session.

15. The method of claim 1, wherein a worst case completion latency for the processing of the one or more overhead messages is at least two times longer than an average completion time for the transmit clock synchronization procedure and an average completion time for the processing of the one or more overhead messages.

16. The method of claim 15, further comprising:
   maintaining synchronization for the transmit clock after the transmit clock synchronization procedure at least until the processing of the one or more overhead messages is completed.

17. An apparatus in a wireless communication system, comprising:
   a call processing module operative to determine to transmit at least one message associated with a delay-sensitive communication session to an access network of the wireless communication system, to send a first command to a first module to perform a transmit clock synchronization procedure to synchronize a transmit clock, and to send a second command to a second command to a second module to receive and process one or more overhead messages from the access network, wherein the first module performs the transmit clock synchronization procedure and the second module processes the one or more overhead messages in parallel instead of sequentially in response to the at least one message to be transmitted being delay-sensitive.

18. The apparatus of claim 17, wherein the call processing module is further operative to update overhead information based on the one or more overhead messages processed by the second module.

19. The apparatus of claim 17, wherein the call processing module is further operative to send a third command to the first module to transmit the at least one message associated with the delay-sensitive communication session to the access network.

20. The apparatus of claim 17, wherein the call processing module is further operative to receive a request to transmit the at least one message associated with the delay-sensitive communication session to the access network, and wherein the first and second commands are sent in response to receiving the request.

21. A wireless device comprising the apparatus of claim 17.

22. An apparatus in a wireless communication system, comprising:
  means for determining to transmit at least one message associated with a delay-sensitive communication session to an access network of the wireless communication system;
  means for sending a first command to a first module to perform a transmit clock synchronization procedure to synchronize a transmit clock; and
  means for sending a second command to a second module to receive and process one or more overhead messages from the access network, wherein the first module performs the transmit clock synchronization procedure and the second module processes the one or more overhead messages in parallel instead of sequentially in response to the at least one message to be transmitted being delay-sensitive.

23. The apparatus of claim 22, further comprising:
  means for updating overhead information based on the one or more overhead messages processed by the second module.

24. The apparatus of claim 22, further comprising:
  means for sending a third command to the first module to transmit the at least one message associated with the delay-sensitive communication session to the access network.

25. The apparatus of claim 22, further comprising:
  means for receiving a request to transmit the at least one message associated with the delay-sensitive communication session to the access network, and wherein the first and second commands are sent in response to receiving the request.

26. A non-transitory computer readable media for storing instructions operable in a wireless device to:
  determine to transmit at least one message associated with a delay-sensitive communication session to an access network of a wireless communication system;
  send a first command to a first module to perform a transmit clock synchronization procedure to synchronize a transmit clock; and
  send a second command to a second module to receive and process one or more overhead messages from the access network, wherein the first module performs the transmit clock synchronization procedure and the second module processes the one or more overhead messages in parallel instead of sequentially in response to the at least one message to be transmitted being delay-sensitive.

27. The non-transitory computer readable media of claim 26, and further for storing instructions operable to:
  send a third command to the first module to transmit the at least one message associated with the delay-sensitive communication session to the access network.

28. A method of accessing a wireless communication system, comprising:
  receiving a command perform a transmit clock synchronization procedure in order to synchronize a transmit clock for transmission of at least one message associated with a delay-sensitive communication session to an access network of the wireless communication system;
  performing the transmit clock synchronization procedure in response to the received command in parallel with updating of overhead information from the access network based on the at least one message being associated with the delay-sensitive communication session; and
  sending the at least one message to the access network upon completion of the transmit clock synchronization procedure and the updating of the overhead information.

29. The method of claim 28, wherein the transmit clock synchronization procedure comprises:
  ascertaining system time;
  resetting a long code generator based on the system time; and
  resetting a pseudo-random number (PN) generator based on the system time.

30. The method of claim 29, wherein the long code generator is used to generate a long code for scrambling data and is reset to a first initial value determined based on the system time, and wherein the PN generator is used to generate inphase and quadrature PN sequences for spectrally spreading data and is reset to second and third initial values determined based on the system time.

31. The method of claim 28, wherein the at least one message includes access probes in accordance with access parameters in the overhead information.

32. The method of claim 28, wherein the at least one message is sent if instructed by the received command and after the clock synchronization procedure has been completed.

33. The method of claim 28, wherein the received command corresponds to separate commands, wherein the separate commands include a first command to perform the transmit clock synchronization procedure and a second command to transmit the at least one message.

34. The method of claim 33, wherein the second command is received after the updating of the overhead information has been completed.

35. An apparatus in a wireless communication system, comprising:
  a first module operative to perform a transmit clock synchronization procedure to synchronize a transmit clock
  a second module operative to receive and process one or more overhead messages from an access network of the wireless communication system; and
  a call processing module operative to determine to transmit at least one message associated with a delay-sensitive communication session to the access network, to send a first command to the first module to perform the transmit clock synchronization procedure, and to send a second command to the second module to receive and process the one or more overhead messages from the access network, wherein the first module performs the transmit clock synchronization procedure and the second module processes the one or more overhead messages in parallel instead of sequentially in response to the at least one message to be transmitted being delay-sensitive.

* * * * *